United States Patent [19]

Howard

[11] 4,261,201
[45] Apr. 14, 1981

[54] WIND CHILL INDICATOR
[75] Inventor: Charlie J. Howard, Fairview, N.C.
[73] Assignee: Sybron Corporation, Rochester, N.Y.
[21] Appl. No.: 62,978
[22] Filed: Aug. 2, 1979
[51] Int. Cl.³ .............................................. G01W 1/06
[52] U.S. Cl. ................................ 73/339 C; 73/861.55; 73/344
[58] Field of Search ................. 73/339 C, 344, 170 R, 73/209, 338.3

[56] References Cited
U.S. PATENT DOCUMENTS

| | | | |
|---|---|---|---|
| 2,190,344 | 2/1940 | Woodling | 73/338.3 X |
| 2,651,201 | 9/1953 | DeMestral | 73/338.3 |
| 3,381,530 | 5/1968 | Lamb | 73/198 |
| 3,623,365 | 11/1971 | Lowell et al. | 73/209 |
| 3,753,371 | 8/1973 | Anderson | 73/170 R X |
| 3,937,082 | 2/1976 | Schilling | 73/212 X |
| 3,954,007 | 5/1976 | Harrigan | 73/170 R |
| 4,047,431 | 9/1977 | Mulvaney | 73/339 C X |
| 4,091,667 | 5/1978 | Anderson et al. | 73/339 C X |
| 4,106,339 | 8/1978 | Baer | 73/339 |
| 4,154,104 | 5/1979 | Worthington | 73/339 C X |
| 4,156,362 | 5/1979 | MacHattie et al. | 73/344 |

Primary Examiner—Daniel M. Yasich
Attorney, Agent, or Firm—Theodore B. Roessel; Joseph C. MacKenzie

[57] ABSTRACT

A wind-chill indicator including a rotameter, a thermometer, and wind chill chart arranged such that the rotameter float's position indicates the chart value expressing the "wind-chill" effect corresponding to the existing velocity and temperature of the wind.

12 Claims, 7 Drawing Figures

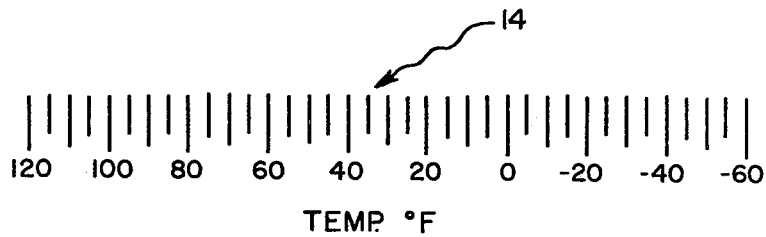
FIG. 5
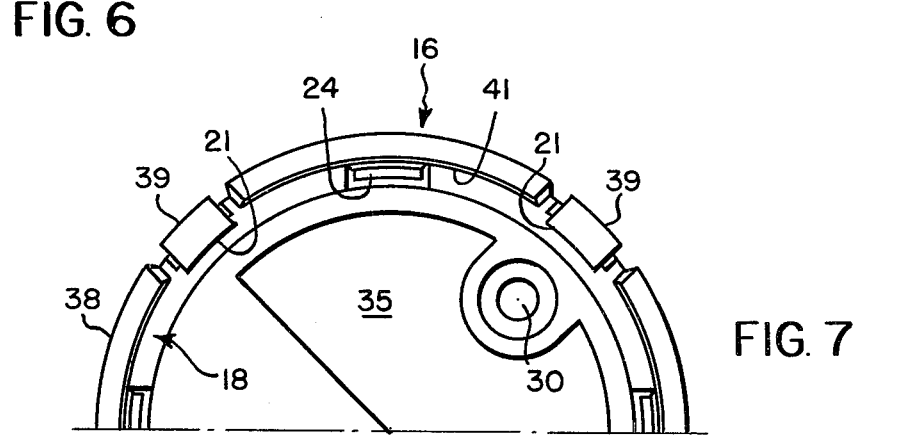
FIG. 4
FIG. 6
FIG. 7

WIND CHILL INDICATOR

FIELD OF THE INVENTION

Most people realize that temperature alone cannot tell them how they will fare, or even feel, when they go outside. Thus, in cold weather they know that with a strong wind blowing they will need more clothing to keep warm than if the wind were not blowing at all. The reason for this is that the wind moving across the body of any homeothermic being carries heat away from the skin surface and the faster the heat is removed, the greater is the demand on the vital capacity of the body, and, at least in the case of humankind, the colder the being feels.

These effects of the wind on people have been studied for many years. About the time of World War II, several research groups combined their data and efforts and came up with a reasonably good way of expressing this cooling effect. They found they could estimate body heat loss, or its effect, by multiplying a factor for the wind and a factor for air temperature. The two variables, wind and air temperature, thereby were reduced to an equivalent calm air temperature called Wind Chill Index. As a result of their work, a table of Wind Chill Index values was published which enables a person to determine wind chill effect, if he knows both wind velocity and air temperature, simply by cross referencing the two variables on the table.

Insofar as the present inventor is concerned, one should not rely on the Wind Chill Index alone to predict how "chilly" one will feel under known weather conditions, since other variables such as one's activities, health, metabolism, state of nourishment, and particularly protective clothing, also affect this subjective feeling. Nonetheless, knowing the Wind Chill Index will enable one to select protective clothing for outdoors with considerable assurance of achieving adequate protection against excessive heat loss, though not necessarily of preventing one from having harmless "chilly" sensations.

In view of the foregoing, the general object of this invention is to provide a new and improved wind-chill indicator which will enable one to forecast the heat-loss effect of wind and temperature, whereby to assist one in choosing such outdoor clothing, and/or in taking other measures, such as will help one maintain one's well-being when outdoors in inclement weather.

A particular object of the invention is to provide a new and improved wind chill indicator having a rotameter for providing the wind velocity component of wind chill.

Other objects of the invention will appear from the description, to follow, of the present invention.

DESCRIPTION OF THE PRIOR ART

The prior art, insofar as the present inventor can find, is adequately represented by the following patent literature (U.S. letters patent, unless otherwise indicated):

| | |
|---|---|
| Vrsaljko | 3,326,045 |
| Lamb | 3,381,530 |
| Anderson | 3,753,371 |
| Harrigan | 3,954,007 |
| Mulvaney et al | 4,047,431 |
| Anderson et al | 4,091,667 |

-continued

| | |
|---|---|
| Shimure et al | 44-25317 (Japan) |

As none of these involve a rotameter, the present inventor deems it unnecessary to discuss them.

SUMMARY OF THE INVENTION

Wind is caused to flow through a rotameter, thereby to position the float in the tube of the rotameter. The tube is vertical (at least not horizontal) and the position of the float corresponds to the velocity with which the wind flows through the tube. There may be a wind velocity scale along the length of the tube, with respect to which the float acts as an index pointing out the actual value of wind velocity. The wind is also caused to flow onto a temperature sensor which thereby takes on the temperature of the wind and moves an index along a given path (which may be visually indicated in the form of a temperature scale) running transversely of the length of the rotameter tube.

A Wind Chill Index chart comprising a family of curves, each corresponding to a particular value of Wind Chill Index and derived from different combinations of temperatures and velocities indicatable upon said scales, is moved to a position where either the length of the rotameter tube coincides with the index of the temperature sensor or the path of the temperature index coincides with the rotameter float. In the former case, the float will indicate the appropriate Wind Chill Index curve, and, in the latter case, the temperature scale index will indicate the appropriate Wind Chill Index curve. Each of these arrangements contemplates positioning the chart by hand, but it is also possible to have the temperature sensor automatically position the chart.

FEATURES AND ADVANTAGES OF THE INVENTION

My novel wind chill indicator, in its most elaborate form, is an original instrument which will simultaneously indicate air temperature, wind speed and wind chill equivalent temperature. In particular, it is a hand-held device for handily using to indicate wind chill, wherever its user may be: on the ski slopes, ice boat or snowboat; while camping, hiking or indulging in any other outdoor activity. Or it can be used in one's backyard, before sending one's children off to school, in order to determine how to properly dress them for the weather they will encounter.

I mention outdoors and backyard advisedly, because the instrument works as intended only when exposed to weather conditions, particularly wind velocity, representative of the outdoor conditions. Thus, one cannot expect to mount the instrument outside one's window and get a reliable indication of anything except the air temperature and air currents in that spot, which, being shielded at least a little, and even warmed, by the house, does not represent the weather on the way to school. As it happens, in the manually-used form, my novel wind chill indicator itself inherently discourages mounting the instrument for wind chill indication very close to a sizable structure such as a house.

BRIEF DESCRIPTION OF THE DRAWING

FIG. 4 is a Wind Chill Factor nomograph suitable for use with my invention, and

FIGS. 5 and 6 respectively illustrate the corresponding temperature and wind velocity scales.

FIG. 7 is a plan view of the upper portion of FIG. 3.

DESCRIPTION OF THE PREFERRED EMBODIMENTS

Figure 1:
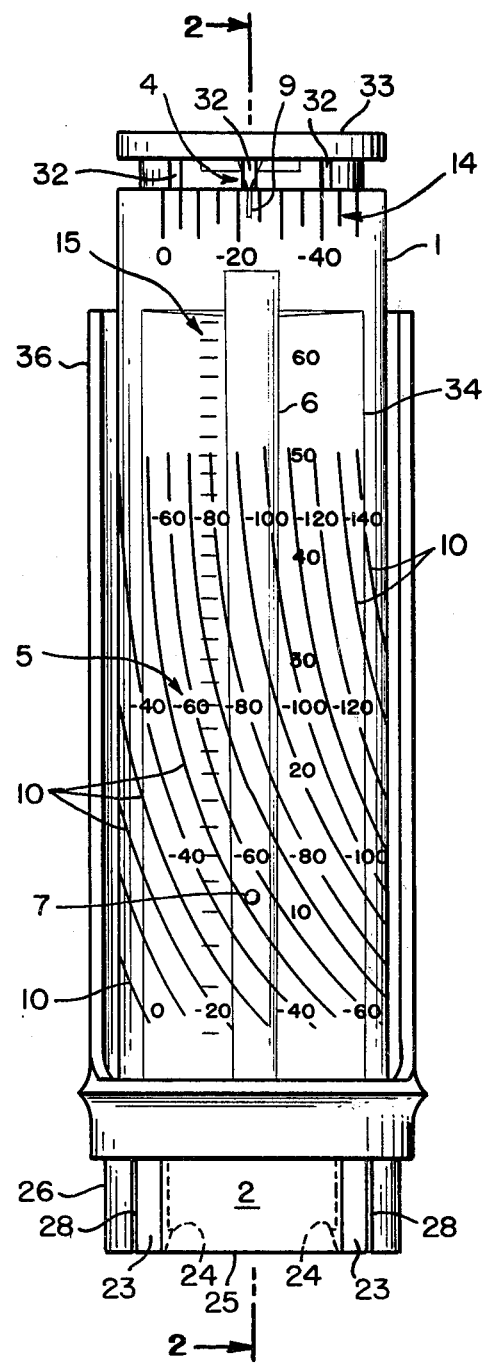
FIG. 1 is a front elevation of my invention.
Figure 2:
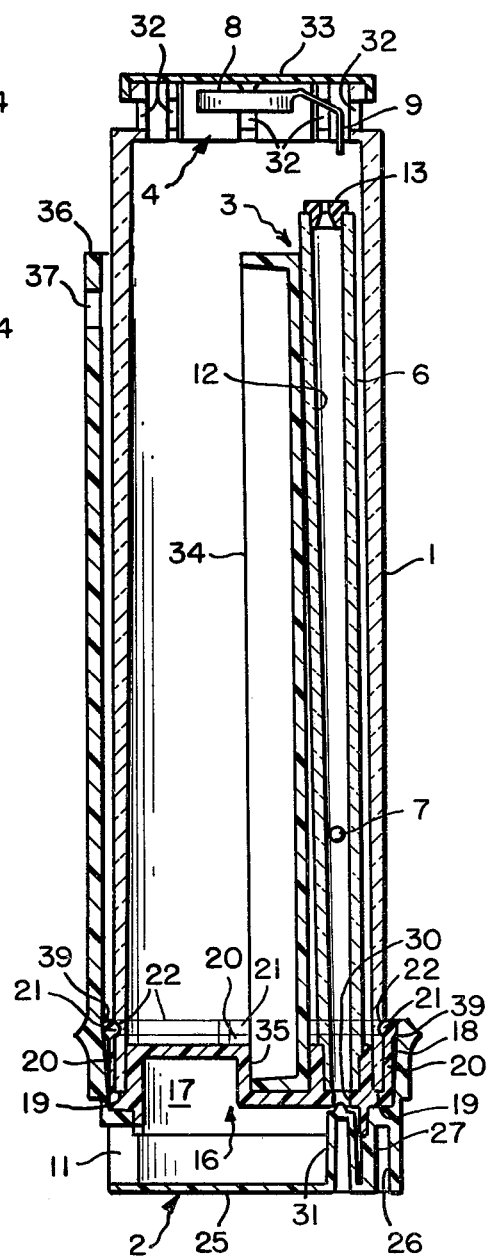
FIG. 2 is a cross-section on the line A—A of FIG. 1.

The form of my novel wind chill indicator shown in FIGS. 1 and 2 consists mainly of a nomograph cylinder 1, a wind sampler 2, a rotameter 3, and a temperature sensor 4. Cylinder 1 has a Wind Chill Index nomogram 5 thereon.

Cylinder 1 is transparent and generally right-circularly cylindrical and has sampler 2 fitted to its lower end in such a way that sampler and cylinder may be rotatably adjusted about the axis of the cylinder with respect to one another. Rotameter 3 has a transparent tube 6 containing flow responsive index means in the form of a polystyrene float 7 for sensing flow and is located inside and next to the surface of the front cylinder 1, atmospheric condition responsive sensor 4 has a temperature-sensing bimetallic element 8 supporting index means in the form of a pointer 9 next to the inner surface of the front of cylinder 1, and nomogram 5 is a family of side by side curves 10 on the outer surface of the front of the cylinder 1.

Sampler 2 has an intake opening 11 for facing toward the wind so that the wind blows into tube 6, entering the lower narrower end of its tapered bore 12, flowing up the bore, past the float 7, and exhausting through an orifice 13 at the upper wider end of bore 12 and into the region of cylinder 1 containing bimetallic element 8, which is preferably of the well-known spiral type, the coils of which are bathed by the wind and hence take on a temperature which corresponds to the temperature of the wind in which the wind chill indicator is immersed, and move the pointer 9 in a pretty much circular arc, normal to the length of tube 6 and parallel to the inner cylindrical surface of cylinder 1.

The position of pointer 9 on said arc is obviously a measure of wind temperature. The height of float 7 is as obviously a measure of wind velocity, since the wind is, in effect, blowing through the rotameter at a rate corresponding to wind velocity outside and adjacent intake 11, and forcing the float 7 up the tube to a point where the weight of the float balances the upward force due to air flow, since this latter force decreases as the cross-section of bore 12 increases.

It would, of course, be possible to put a temperature scale 14 on the outer or inner surface of the cylinder 1 along the path of the end of pointer 9, and, as well, a wind velocity scale 15 along the length of tube 6, (or on the inner or outer surface of cylinder 1) and parallel to the axis of cylinder 1. Though such scales are optional I have shown them in the drawings.

The nomograph is derived in effect from making determinations of wind chill variation, while varying wind velocity at various fixed wind temperatures. For instance, from left to right, the illustrated nomograph curves 10 represent wind chill factors for constant temperatures. As a practical matter, the curves 10 may be plots of values obtained from the above-mentioned tables.

In order to use the above-described form of my invention, one goes into the environment for which the wind chill factor is to be measured, faces the wind and points intake 11 directly into the wind, while maintaining the indicator in a position where the rotameter tube 6 is vertical. One waits, with the indicator in such position, till the element 8 has the same temperature as the wind in which element 8 is bathed, and then rotates the cylinder 1 with respect to sampling means 2 until, from the view of FIG. 1 hereof, the float 7 and pointer 9 fall on the same vertical line (in this case, they actually are in the vertical plane containing both float 7 and the axis of cylinder 1—and also the axis of the tube 6, supposing this to be right-circularly-cylindrical in outward shape). At this point, a radius of cylinder 1, passing through the float 7, if extended to nomograph 5 will either intersect a wind chill factor curve 10, or, a definite point on an adjacent, but undelineated wind chill curve which can be identified by interpolation or extrapolation. Thus, in FIG. 1, float 7 is below the curve for wind chill factor of −60, but evidently not so far below as the curve for a −50 wind chill factor, included in the nomograph 5, but without numeral. Accordingly, one would estimate the wind chill factor to be about −55. It will be observed that the wind velocity is about 11 mph, but the air temperature is about −22.5° F.

In FIGS. 4, 5 and 6 respectively, I show the complete nomograph 5, along with the temperature scale 14 and wind velocity scale 15. The temperature scale 14 is shown uniformly graduated in equi-sized degree-indicia (Fahrenheit), because the typical spiral bimetallic coil is easily designed to respond linearly to temperature over the range used here (120 to −60). The wind velocity graduations (miles per hour), on the other hand, diminish for equal increments of wind velocity, inasmuch as it is more convenient to shape the bore 12 in the form of the frustum of a cone, and hence obtain non-linear wind velocity scale, rather than in the form of a paraboloidal surface of revolution such as would provide a more linear wind velocity scale.

It should be observed that the numerical values of Wind Chill Factors have no necessary connection with the units in which wind velocity and temperature are expressed, and in fact the sort of numbers one wishes to use for chill factors is open to wide choice. However, the effect of wind is to make matters worse, so to speak, as the temperature drops. Hence, for psychological reasons it is preferable to make the Wind Chill Index a number, which looks like a temperature lower than actual air temperature, as long as there is a wind blowing. Actually, FIG. 3 implies that wind is not a factor in the thermal state of human beings when its temperature is at or about human body temperature.

Figure 3:
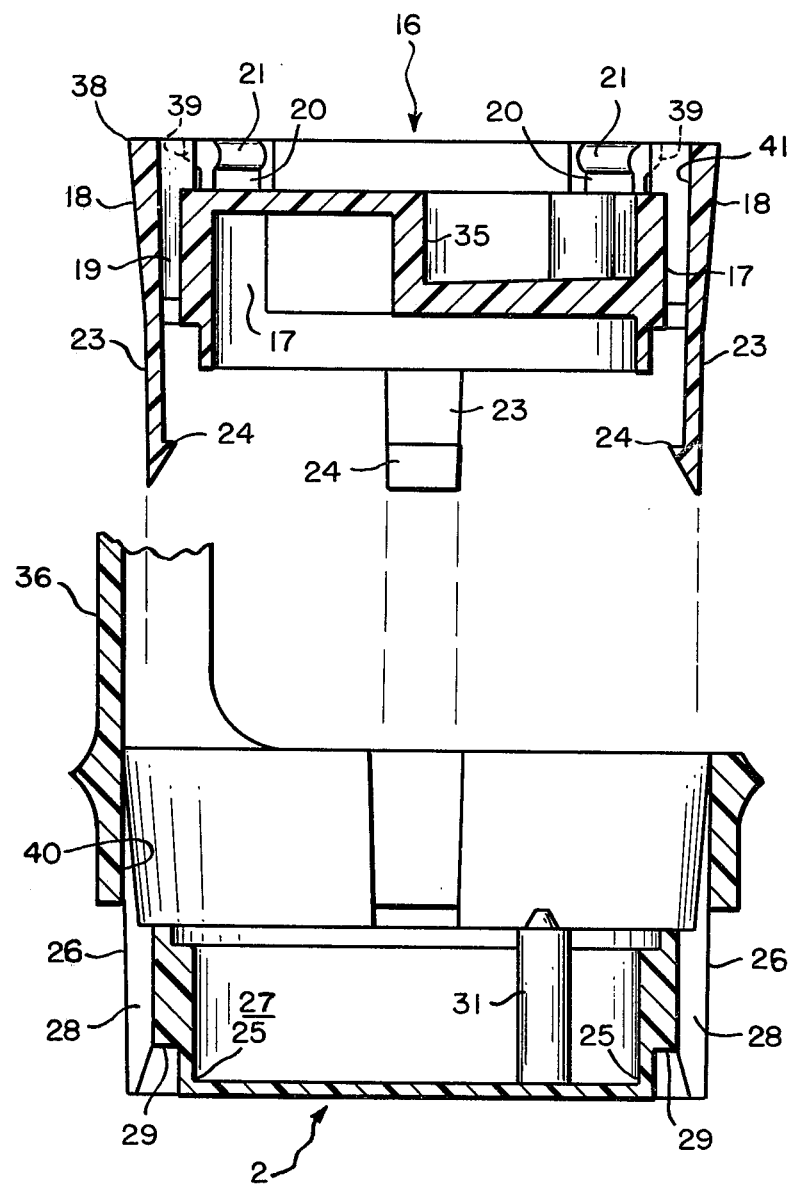
FIG. 3 is an enlarged, fragmentary exploded sectional view on a plane rotated 45° from the plane corresponding to the section on the line A—A of FIG. 1.

As shown in FIGS. 2 and 3, tube 6 is supported by a base 16. Base 16 has an inner cylindrical flange 17, surrounded by the outer cylindrical flange 18 equispaced from flange 17 and also part of base 16, whereby to leave an annular space 19. Flange 18 has fingers 20 formed therein and having rounded elements 21 projecting therefrom and fitting into a circular groove 22 in cylinder 1 and extending around the lower circumference thereof, which fits snugly into space 19, and is held there by fingers 20, inasmuch as these have to be bent away from the cylinder in order to free elements 21 from groove 22, whereby to allow the cylinder's lower circumference to be pulled out of space 19. (By more or less the reverse process, of course, the cylinder 1 is assembled to the base 16).

Flanges 17 and 18 and base 16 are parts of a single casting, the fingers 20 being cantilever elements integral with the material (acrylic or the like) of the flange 18 and having a springy nature holding them in place with elements 21 in the groove 22.

Fingers 23, having wedges 24 projecting inwardly therefrom toward the axis of cylinder 1, provide for resiliently clamping a main base 25 having cylindrical flanges 26 and 27. Flange 27 is interrupted by slots 28 for receiving fingers 23. In addition, dogs 29 project from flange 26 into the space between slots 28 and flange 26 for catching the wedges 24 thereon whereby to lock the two bases 16 and 25 together and form sampler 2. The fingers 23 are integral with the flange 18 and springlike in order to stay in place in slots 28, unless bent out of place, temporarily in order to assemble or disassemble the bases 16 and 25 to or from each other.

Base 25, which is hollow, has the opening 11 in its flanges 26 and 27, allowing access by a sample of the atmosphere whose chill factor is being determined. Thus, driven by the "wind," a portion of such atmosphere enters the interior of base 25 via opening 11 and leaves the interior of base 25 via bore 12, entering the latter at an opening 30 in base 16 where the tube 6 joins base 16.

In order to keep float 7 from falling out of tube 7, various known expedients may be adopted. In this case, I provide a pin projecting into tube 6 in the form of pedestal 31 forming a part of base 25, as shown. The upper end of pedestal 31 is enough lesser in diameter than the opening 30 partially receiving it that it does not interfere with metering the flow of the sampled portion of atmosphere entering the tube 6. The fixed orifice 13 actually determines the metering action in combination with the variable orifice formed by float 7 with the bore 12. Suitable holes 32 in the upper end portion of cylinder 1, are provided in order to allow the wind to enter therein, and then escape the instrument after it has diffused about heat-sensitive coil 8. Holes 32 sample the wind, but being equi-spaced at 45° intervals, do so regardless of wind direction or of the angular position of cylinder 1. The upper end portion of cylinder 1 is closed by a cap 33, the latter also having the sensor 4 fixed to its underside. Preferably, the wind velocity scale 15 is on a member 34 the lower end of which is received in socket 35 in base 16 and may be colored to provide a contrasting opaque backing behind transparent tube 6 for ease in determining the position of float 7, and may be longitudinally recessed to partially embrace tube 6 and present scale 15 closer to the front wall of transparent cylinder 1.

While the sampler 2 provides a base allowing the instrument to sit on a table or the like, and can be grasped manually for operating the instrument, I prefer to supply a hand grip 36 for the latter purpose, especially since use of the hand grip pretty much assures that the wind sampling opening won't be obscured by a hand or clothing, as might happen, if one holds the device by the sampler 2 while using the instrument.

Hand grip 36 is an extension of flanges 26 and 27 and preferably extends longitudinally for a bit less than to the upper end of tube 1, and laterally for about half the circumference of tube 1. The dimensioning will leave plenty of room for gripping the upper end of cylinder 1, and for viewing the various scales, etc.

Necessarily, the cap 33 is fixed to the cylinder, so that as one turns the cylinder in place in the sampler structure against the friction of the fitted parts adjacent and in space 19, the cap moves with the cylinder. Slippage between cap and cylinder would alter the relation between pointer 9 and scale 14 and thereby make the Wind Chill Index readings erroneous. A hole 37 in handle 36 provides for hanging the instrument when not in use.

The interlocking nature of bases 16 and 25 is useful for several reasons. The user, for example, should be able to disassemble the instrument for cleaning purposes. This is done by deflecting the fingers 23 outwardly until the wedges 24 clear dogs 29, and then removing base 16 and cylinder 1, as a body, from base 25. Now, the cylinder 1 can be pulled out of base 16, since the rounded elements 21, due to their curvature, will cause fingers 20 to deflect outwardly if one trys to pull cylinder 1 out of space 19 with no more than a modest amount of force.

Preferably, the outer peripheral edge 38 of flange 18 has the same radius as the peripheral edges 39 of the fingers 20, when the rounded elements are in place in groove 22, this radius being such that when the base 16 and cylinder 1 are in place in cylinder 26, the edges 38 and 39 just contact, and, as shown in FIG. 3, fit to the adjacent inner surface 40 of base 25 where the latter begins to develop into handle 36. The fitted surfaces being circularly right-cylindrical, this locates the base 16 accurately in base 25. Since the lower end of cylinder 1 fits the inner surface 41 of flange 18 the same way, when rounded elements 21 are in place in groove 22, cylinder 1 is likewise located accurately in base 16. As fingers 23 fit snugly in slots 28, the spatial relationship of bases 16 and 25, and cylinder 1, is quite stable, and remains that way even when subject to frequent assembly and disassembly.

While the parts of the novel wind chill indicator may obviously be otherwise realized and/or secured together, the construction just described is optimum for development or modification purposes. For example, in an instrument like this, it is very difficult to deal with modifying, refining, or even developing its function, calibration, etc., unless it can be taken apart and reassembled with ease frequently, and with repeatability of reassembled configuration. Thus, present float 7 is made of polystyrene foam. This requires an orifice 13 of a size which will not only keep the float from being blown out of bore 12, but also requires that the orifice regulate the flow through the bore to a range of values such that the full travel of the float will correspond to a desired range of actual wind velocity. Again, the distribution of the flow velocity graduations depends on the shape of bore 12, among other things. All such factors ultimately influence the Wind Chill Index curves, themselves empirically derived and subject to refinement and modification. In view of the foregoing, therefore, it is obvious that seemingly minor modification, such as change in float material, might require adjustments of calibration, etc., which would be difficult to carry out with, say, a structure which had to be cemented together or was otherwise not easily taken apart and accurately reassembled.

I claim:

1. A wind chill indicator comprising the combination of:

(a) a rotameter tube in a cylinder and having first index means therein, said first index means being movable, in response to flow of fluid through said tube, to positions along the length thereof, which positions correspond to the rate of said flow;

(b) a temperature sensor having second index means, said second index means being movable by said sensor, in response to temperature, to positions along a path transverse to said length of said tube, which positions correspond to the temperature of said sensor, and (c) sampling means for directing wind through said tube and onto said sensor, both for causing first index means to move along the length of said tube to a position corresponding to wind velocity and for causing said temperature sensor to have a temperature corresponding to wind temperature, whereby said second index means is moved along said path to a position corresponding to wind temperature;

said wind chill indicator having a nomograph displayed on said cylinder, said nomograph expressing wind chill values in accordance with a predetermined function of wind velocity values and wind temperature values, said nomograph being scaled to the respective said positions of said first and second index means;

said nomograph and both said index means being relatively positionable for aligning said first and second index means with the corresponding respective wind velocity and wind temperature values of said nomograph, whereby said nomograph provides an indication of the actual wind chill factor corresponding to said actual wind velocity and said actual wind temperature, and there being positioning means operable for so relatively positioning said nomograph and said first and second index means.

2. The wind chill indicator of claim 1, there being manual means for operating said positioning means.

3. The wind chill indicator of claim 2, said cylinder being manually movable by said positioning means with respect to said second index for locating a wind chill factor on said nomograph with respect to said first index means.

4. An instrument comprising, in combination:
(a) a base member having an indicator tube upstanding therefrom, said tube having flow sensing means therein;
(b) said base member having a housing upstanding therefrom, enclosing said indicator tube; and having atmospheric condition temperature sensing means therein;
(c) said base member having a wind sampling means and means interconnecting said housing and said sampling means;
(d) said sampling means providing wind with access to said tube for providing flow to be sensed by said flow sensing means, and
(e) said condition sensing means also being accessible to wind for sensing said atmospheric condition;
(f) said housing including a nomograph for combining atmospheric condition sensing by said condition sensing means and flow sensing by said flow sensing means for providing a measure of the combined effect of wind and said atmospheric condition on a human being exposed to said wind.

5. The instrument of claim 4, wherein said atmospheric condition is temperature.

6. In an instrument having first means for measuring a first condition of an atmosphere, second means for measuring a second condition of said atmosphere, third means for sampling said atmosphere and exposing said first and second means thereto, and tubular fourth means providing a nomogram for determining the prevailing value of a factor representing the joint effect of said conditions on homoiothermic beings contacted by wind of said atmosphere, said first, second, third and fourth means being constructed and arranged such that said value's location on said nomogram is given by said first and second means;

said instrument having the improvement comprising said first means measuring said first condition by providing a rotameter inside said tubular fourth means, said rotameter measuring velocity of said wind, and said third means sampling said atmosphere by permitting said wind to cause a portion of said atmosphere to flow through the tube of said rotameter at a rate representative of the velocity of said wind.

7. The instrument of claim 6, wherein said second means includes heat sensitive means for measuring the temperature of said wind.

8. The instrument of claim 6, wherein said second means includes heat-sensitive means for contacting said atmosphere for measuring the temperature thereof and said improvement comprises cylinder means enclosing said second means and said tube of said rotameter, said cylinder means having openings located for omni-directionally admitting and discharging said atmosphere respectively to said heat-sensitive means and out of said cylinder means, for measuring the temperature of said atmosphere.

9. The instrument of any one of claims 6, 7 and 8, wherein said improvement includes housing means supporting said first and second means and said nomogram for movement of said nomogram relative to said first and second means for positioning the float of said rotameter and the value of said second condition with respect to the nomogram such as to provide an indication of said prevailing value.

10. The instrument of any one of claims 6, 7 and 8 wherein said improvement includes housing means supporting said first and second means and said nomogram for movement of said nomogram relative to said first and second means for positioning the float of said rotameter and the value of said second condition with respect to the nomogram such as to provide an indication of said prevailing value, and said housing means including means for manually creating said movement.

11. The instrument of any one of claims 6, 7 and 8, wherein said improvement includes housing means supporting said first and second means and said nomogram for movement of said nomogram relative to said first and second means for positioning the float of said rotameter and the value of said second condition with respect to the nomogram such as to provide an indication of said prevailing value;

said housing means including a base having said tube extending therefrom; the length of said tube being perpendicular to said base;
said nomogram lying on a hollow transparent cylinder enclosing said tube and rotatably engaged at one end with said base, the axis of rotation of said cylinder being perpendicular to said base.

12. The instrument of any one of claims 6, 7 and 8, wherein said improvement includes housing means supporting said first and second means and said nomogram for movement of said nomogram relative to said first and second means for positioning the float of said rotameter and the value of said second condition with respect to the nomogram such as to provide an indication of said prevailing value;
  said housing means including a base having said tube extending therefrom; the length of said tube being perpendicular to said base;
  said nomogram lying on a hollow transparent cylinder enclosing said tube and rotatably engaged at one end with said base, the axis of rotation of said cylinder being perpendicular to said base;
  said second means being provided at the other end of said cylinder and adjacent the corresponding end of said tube
  said third means being provided on said base for admitting said portion to the other end of said tube so that the first said end of said tube discharges said portion, said cylinder having holes therearound and adjacent said second means.

* * * * *